US005534098A

United States Patent [19]

Kerle

[11] Patent Number: 5,534,098

[45] Date of Patent: Jul. 9, 1996

[54] PROCESS AND DEVICE FOR PRINTING ON TEXTILES

[75] Inventor: Thomas Kerle, Furth, Germany

[73] Assignee: Eidos Lizenzverwertungs GmbH, Kummersbruck, Germany

[21] Appl. No.: 300,481

[22] Filed: Sep. 2, 1994

[30] Foreign Application Priority Data

Sep. 3, 1993 [DE] Germany .......................... 43 29 741.2

[51] Int. Cl.[6] .................................................. B32B 31/00

[52] U.S. Cl. .......................... 156/230; 156/277; 156/289

[58] Field of Search .................................... 156/277, 230, 156/240, 267, 289

[56] References Cited

U.S. PATENT DOCUMENTS 4,971,644 11/1990 Mahn, Sr. et al. ...................... 156/267

*Primary Examiner*—Chester T. Barry

*Attorney, Agent, or Firm*—Robin, Blecker, Daley & Driscoll

[57] ABSTRACT

A process for printing for producing a transparent imprint on a transparent fabric, comprises the steps of applying the ply of the fabric to be printed on onto a base provided with a heat-resistant anti-adhesive coating, feeding an offset-transfer onto the area of the fabric to be printed on, covering the areas of the fabric not to be printed on with a thermal insulation layer, applying pressure directed against the base at least on the offset-transfer at a temperature of more than 90° C. for a period of at least 5 seconds, relieving at least the printed area of the fabric and removing the offset-transfer as well as the thermal insulation layer from the fabric and removing the fabric from the base.

7 Claims, 2 Drawing Sheets

PROCESS AND DEVICE FOR PRINTING ON TEXTILES

FIELD OF THE INVENTION

The present invention relates generally to processes and devices for printing on textiles and pertains more particularly to producing a transparent imprint on transparent fabrics, such as nylon hosiery.

BACKGROUND OF THE INVENTION

According to the state of the art, various processes are known for printing on textile fabrics. For printing on transparent fabrics, for nylon hosiery, in particular, patterns have thus far been applied by means of the known screen printing process. This has the disadvantage, however, that the fabric loses its transparency in the area of the imprint, by which the overall optical impression of fabrics printed on in this manner is negatively influenced.

Moreover, the screen printing processes generally use inks which are liquefied with organic solvents. During the drying of these inks, the volatile solvents are released, which leads to a deterioration of the ambient air at the work place, so that ambient air monitoring systems and appropriate ventilation devices must be provided, in order to maintain the legally permissible MAK [maximum work place concentrations] values. Furthermore, the solvent-containing exhaust air contributes to harming the environment.

In addition, according to the state of the art, and especially for printing on T-shirts, a hot-pressing process is used, in which the textile to be printed on is fed onto a base, whereupon a screen printing transfer similar to a transfer picture is placed on the area of the textile to be printed on, and this is transferred onto the fabric under the pressure action of a counterplate corresponding to the base, at a raised temperature. No imprint having a transparent effect can be produced according to this technique, either, particularly since the layer of ink applied by the screen printing transfer is relatively thick, so that the imprint transferred onto the fabric is characterized by a closed-pore, non-transparent appearance. Particularly when under tensile stress, such as may occur during washing of textiles, for example, cracks may appear in the imprinted layer of ink, which must also be regarded as negative from an aesthetic point of view.

SUMMARY OF THE INVENTION

Against the background of the disadvantages described above, the present invention has as its primary object the provision of a simple and low-cost process, by which particularly a transparent imprint can be produced even on sensitive fabrics, which is durable and appealing in its aesthetic appearance.

A further object of the invention is to provide a device to implement the process.

In attaining these and other objects, the invention provides a process including the steps of applying the ply of fabric to be printed on onto a base provided with a heat-resistant anti-adhesive coating, feeding an offset-transfer onto the area of the fabric to be printed on, covering the areas of the fabric not to be printed on with a thermal insulation layer, applying pressure directed against the base at least on the offset-transfer at a temperature of more than 90° C. for a period of at least 5 seconds, relieving at least the printed area of the fabric, and removing the offset-transfer as well as the thermal insulation layer from the fabric and removing the fabric from the base.

The described process is based particularly on the following considerations. To produce a transparent imprint, in which the open-pore structure of the fabric must be preserved, it is necessary to apply the ply of fabric preferably directly and tautly onto a base provided with an anti-adhesive coating. Printing, similarly as on T-shirts, where the fabric is placed in a multilayer manner onto a base, has proved to be disadvantageous, since here microfolds and thus closed-pore sections of fabric are formed in the ply of fabric to printed on, inhibiting an evenly transparent imprint.

In order to avoid damaging especially fine fabrics, such as nylon hosiery, during applying onto and removing from the base, the invention provides that the latter be provided with a heat-resistant anti-adhesive coating. For this, a coating by plastic materials, such as tetrafluoroethylene (e.g., TEFLON) is especially suitable. With regard to the offset-transfers used here, it is clear from the aforesaid that the thickness of the layers of ink used here is adjusted in such a manner as to ensure a transparent imprint on transparent fabrics.

According to a further step of the process, it is provided for the protection of the fabric that a thermal insulation covering be provided over the parts of the fabric not to be printed on. This can be done preferably by a layer of paper.

According to a further advantageous form, the thermal insulation covering can also include the offset-transfer, so that both applying the covering and applying the offset-transfer can be executed in one process step.

The actual printing operation is adjusted with regard to pressure temperature and period of pressure particularly to forming a transparent imprint on sensitive, transparent fabrics. After completing the printing operation, the imprinted textile is pulled off from the base after the thermal insulation layer and the offset-transfer are removed.

According to an additional solution of the invention with a device for printing on textiles with a base, onto which the fabric to be printed on can be applied, and where for creating a pressure a counterplate corresponding to the base is provided, arranged swivelling towards the base, with the device being heatable, it is provided that at least the base and/or the corresponding counterplate(s) be coated with a heat-resistant anti-adhesive coating.

According to an advantageous form, the base can be formed by a plate which is preferably coated on all sides, so that a transparent fabric, for example in the form of a nylon stocking, can be pulled on over the base. Advantageously, the base is in this case formed in its section in such a manner that it will correspond to a vertical projection of a part of the body, a leg, for example. If applicable, it can also be advantageous to provide the base in the physical shape of the part of the body to be clothed. In the aforementioned cases the counterplates display forms corresponding to the base.

According to a further advantageous form, several bases can be provided on a device, onto which the counterplates can be brought into contact under pressure from various sides, so that printing on the textiles is possible from various sides. To this end, the device can also be pivoted around a horizontal axis, so that to side of the textile is printed on, whereupon the device is rotated 180° and subsequently a second side of the textile is printed on after the second offset-transfer is applied by pressure from a second counterplate.

The foregoing and other objects and features of the invention will be further understood from the following detailed description of preferred embodiments and practices and from the drawings, wherein like reference numerals identify like components throughout.

DETAILED DESCRIPTION OF PREFERRED EMBODIMENTS AND PRACTICES

Figure 1:
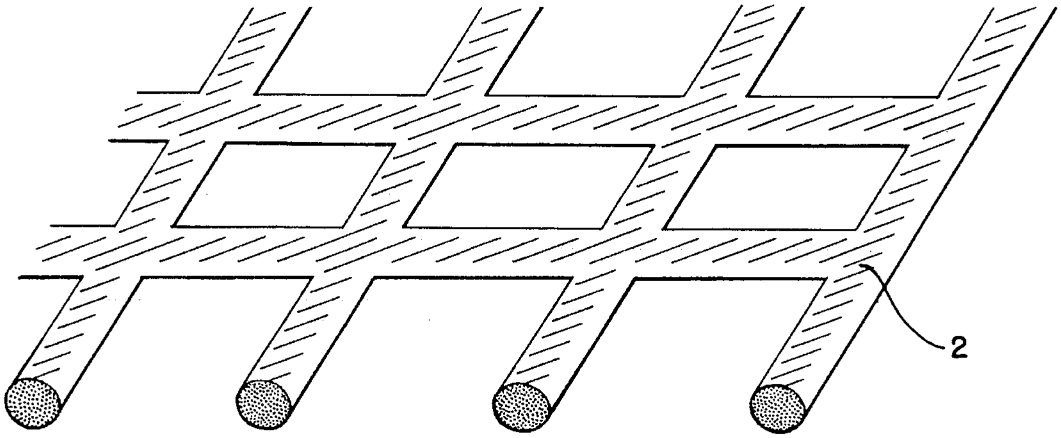
FIG. 1 shows a perspective schematic view of a transparent imprinted fabric.

In the perspective representation according to FIG. 1, a greatly enlarged view is shown of an imprinted transparent fabric 2 in its open-pore form. It becomes particularly clear from this figure that for the production of a transparent appearing imprint on such a fabric it is absolutely necessary that only the fibers, particularly the top side of the fibers, are printed on, but with the pores kept open at the same time.

Figure 2:
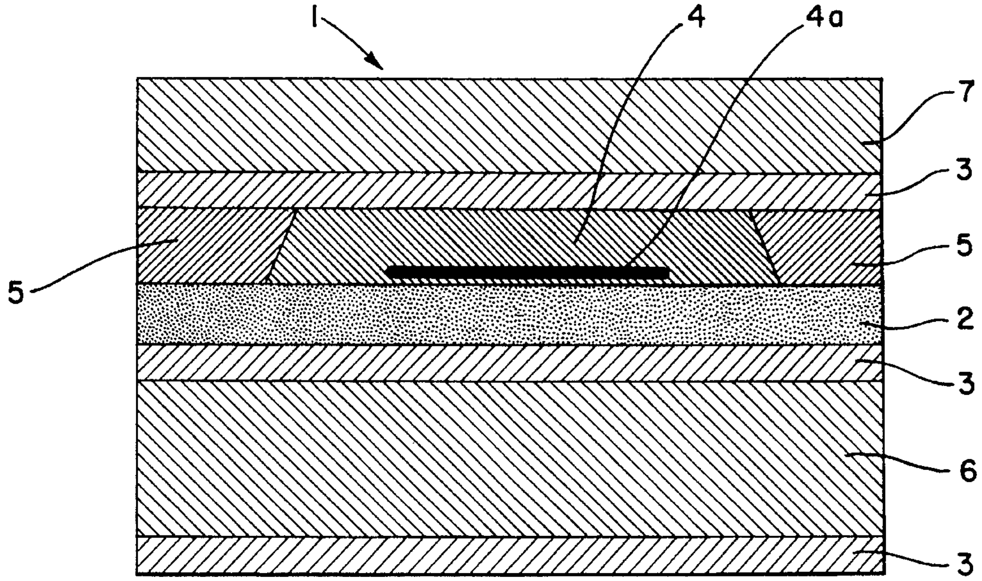
FIG. 2 shows a schematic section of a sectional side elevation through a device according to the invention, showing the printing arrangement during the printing operation.

To this end, the process as shown in FIG. 2 is used. The fabric 2 to be printed on is applied directly onto a base 6 which is provided with an anti-adhesive coating 3. In the area to be printed on, an offset-transfer 4 rests with its ink side 4*a* against the surface of the fabric. The fabric areas not intended to be printed on are covered with a thermal insulation layer 5, which expediently can be of paper. By means of the counterplate 7, which is also coated with an anti-adhesive coating 3, pressure is applied to the offset-transfer 4 under a simultaneous action of heat on it. Heating of the device is effected preferably by thermostatically controlled heating elements which are provided within the base 6 and/or the counterplate 7.

Figure 3:
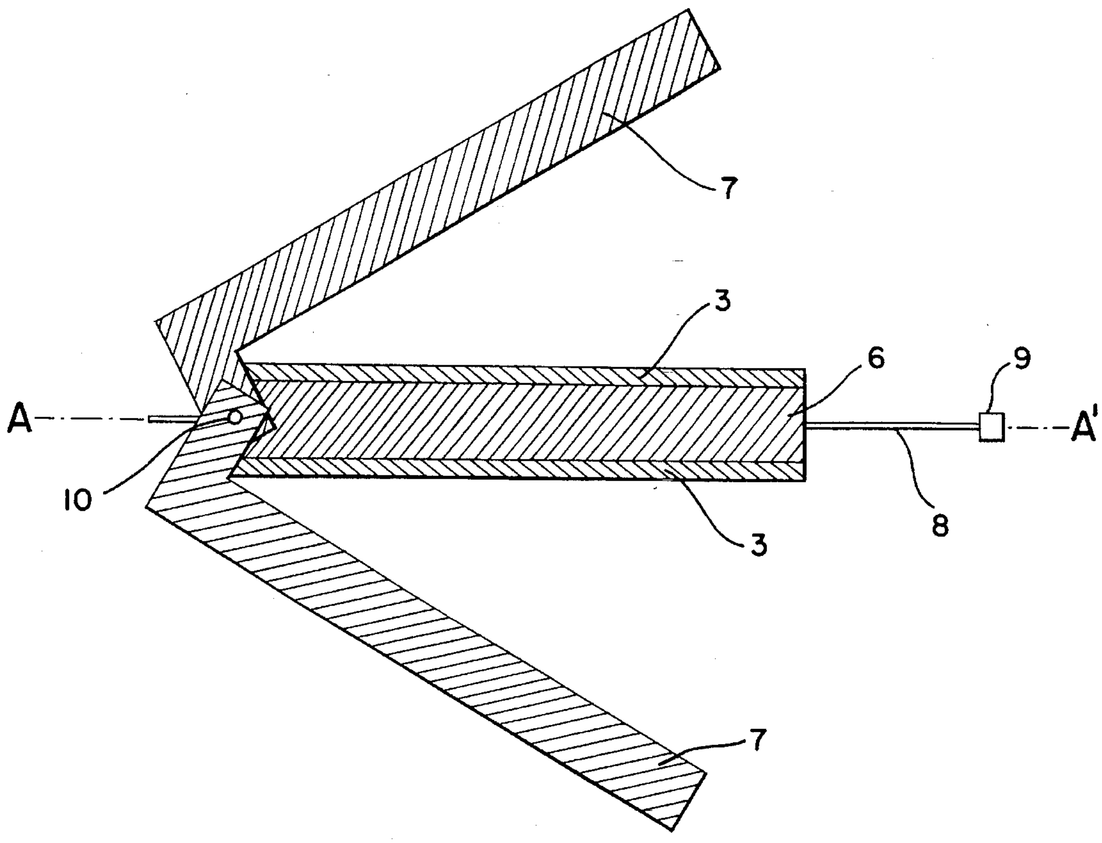
FIG. 3 shows a schematic side view of a printing device according to the invention.

FIG. 3 shows in a schematic side view an additional specific embodiment of a device of the invention for printing on transparent fabrics. As is apparent, two counterplates 7 are provided in this specific embodiment, which are pivoted on the top and bottom side, respectively, of the base. The base 6 is movable around a horizontal axis 8 by means of a lever 9 in such a manner that the bottom counterplate 7 is pivoted upwards.

Figure 4:
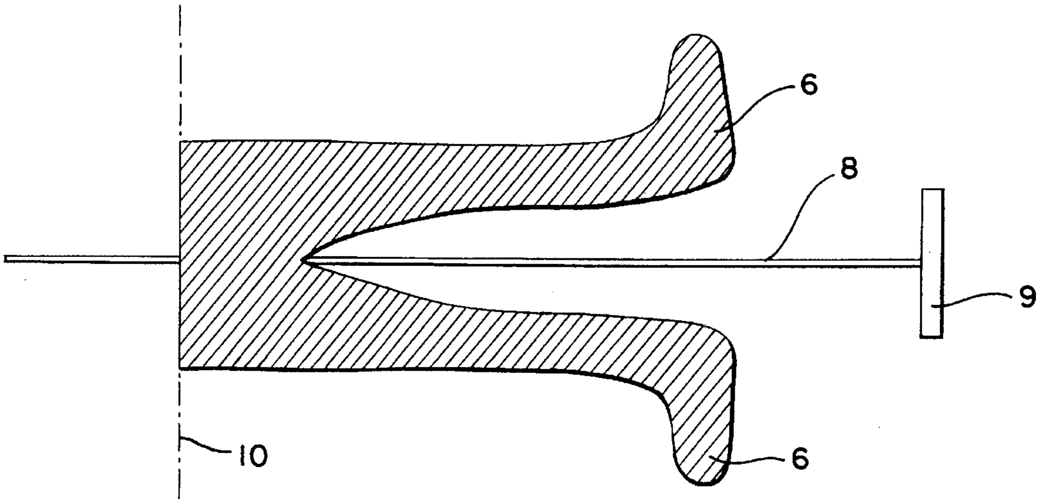
FIG. 4 shows a horizontal section on a printing device of the invention according to FIG. 3, along the line A–A' of FIG. 3.

Lastly, in FIG. 4 a horizontal section is shown of a device according to FIG. 3 along the line A–A'. Here, two bases 6 can be recognized, which are shaped in the form of lateral leg projections. The counterplates, not shown here, are shaped correspondingly and together with the base 6 they are pivoted horizontally around the axis 8 by means of the lever 9.

The described device can of course be automated by way of known means, so that the counterplate is movable pneumatically or hydraulically against the base. The contact pressure, the pressure period and the pressure temperature can be adjustable parameters of a process course controlled by a process control computer.

Various changes to the particularly disclosed process and apparatus may evidently be introduced without departing from the invention. Accordingly, it is to be appreciated that the particularly discussed and depicted preferred embodiments and practices of the invention are intended in an illustrative and not in a limiting sense. The true spirit and scope of the invention are set forth in the ensuing claims.

What is claimed is:

1. A process for printing for producing a transparent imprint on a transparent fabric, comprising the steps of:

(a) applying the ply of the fabric to be printed on onto a base provided with a heat-resistant anti-adhesive coating;

(b) feeding an offset-transfer onto the area of the fabric to be printed on;

(c) covering the areas of the fabric not to be printed on with a thermal insulation layer;

(d) applying pressure directed against the base at least on the offset-transfer at a temperature of more than 90° C. for a period of at least 5 seconds;

(e) relieving at least the printed area of the fabric; and (f) removing the offset-transfer as well as the thermal insulation layer from the fabric and removing the fabric from the base.

2. The process according to claim 1, wherein, prior to applying the ply of fabric to the base, the base is covered with a thermal insulation layer and wherein the thermal insulation layer removed together with the printed on fabric after the printing operation is completed.

3. The process according to claim 1, the base is provided in shape corresponding to the fabric whereby the fabric area to be printed on is maintained taut.

4. The process according to claim 1, wherein the offset-transfer and the thermal insulation layer are applied simultaneously.

5. The process according to claim 1, wherein the area to be printed on is heated to a temperature of 150° to 220° C., and subjected to pressure for a period of 5 to 45 seconds.

6. The process according to claim 5, wherein the area to be printed on is heated to a temperature of 190° C.

7. A process according to claim 1, wherein the fabric is printed on at different places simultaneously.

* * * * *